US012001162B2

(12) United States Patent
Ohmori et al.

(10) Patent No.: US 12,001,162 B2
(45) Date of Patent: Jun. 4, 2024

(54) CLEANING BLADE FOR INTERMEDIATE TRANSFER MEDIUM, AND IMAGE FORMING APPARATUS

(71) Applicants: Masahiro Ohmori, Kanagawa (JP); Keiichiro Juri, Kanagawa (JP); Takuya Akiyama, Kanagawa (JP)

(72) Inventors: Masahiro Ohmori, Kanagawa (JP); Keiichiro Juri, Kanagawa (JP); Takuya Akiyama, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/098,730

(22) Filed: Jan. 19, 2023

(65) Prior Publication Data

US 2023/0236536 A1 Jul. 27, 2023

(30) Foreign Application Priority Data

Jan. 27, 2022 (JP) ................................ 2022-010879

(51) Int. Cl.
*G03G 21/00* (2006.01)
*G03G 15/16* (2006.01)

(52) U.S. Cl.
CPC ....... *G03G 21/0017* (2013.01); *G03G 15/161* (2013.01)

(58) Field of Classification Search
CPC ........................ G03G 21/0017; G03G 15/161
See application file for complete search history.

(56) References Cited

U.S. PATENT DOCUMENTS 5,450,184 A * 9/1995 Yanai ................ G03G 21/0017 399/350
2014/0205338 A1* 7/2014 Gondoh ............ G03G 21/0017 399/350
2015/0177653 A1* 6/2015 Seki .................... G03G 15/162 399/101

(Continued)

FOREIGN PATENT DOCUMENTS

JP 06-348193 12/1994
JP 10-214009 8/1998

(Continued)

OTHER PUBLICATIONS

Extended European Search Report dated Jun. 23, 2023, in corresponding European Patent.

*Primary Examiner* — Stephanie E Bloss
*Assistant Examiner* — Michael A Harrison
(74) *Attorney, Agent, or Firm* — XSENSUS LLP

(57) ABSTRACT

A cleaning blade for an intermediate transfer medium is provided. A cleaning target of the cleaning blade is an intermediate transfer medium. The cleaning blade includes an edge layer and a coating layer. The coating layer provided on a forefront end of the edge layer at which the edge layer contacts the intermediate transfer medium contains a first fluorine-based resin and a second fluorine-based resin incompatible with the first fluorine-based resin. The cleaning blade for an intermediate transfer medium has a Martens hardness of 0.5 $N/mm^2$ or greater and 3 $N/mm^2$ or less at a location having a distance of 20 μm from a ridgeline of the forefront end of the edge layer.

16 Claims, 4 Drawing Sheets

(56) References Cited

U.S. PATENT DOCUMENTS

| | | | |
|---|---|---|---|
| 2016/0004190 | A1 | 1/2016 | Nakamura et al. |
| 2017/0003643 | A1 | 1/2017 | Aoyama et al. |
| 2021/0216032 | A1 | 7/2021 | Watanabe et al. |
| 2022/0221817 | A1 | 7/2022 | Juri et al. |

FOREIGN PATENT DOCUMENTS

| | | |
|---|---|---|
| JP | 2853598 | 2/1999 |
| JP | 2000-147972 | 5/2000 |
| JP | 3278733 | 4/2002 |
| JP | 2004-101551 | 4/2004 |
| JP | 2017-016083 | 1/2017 |
| JP | 2022-124440 | 8/2022 |
| WO | WO2022/172111 A1 | 8/2022 |

* cited by examiner

CLEANING BLADE FOR INTERMEDIATE TRANSFER MEDIUM, AND IMAGE FORMING APPARATUS

CROSS-REFERENCE TO RELATED APPLICATION

The present application claims priority under 35 U.S.C. § 119 to Japanese Patent Application No. 2022-010879 filed Jan. 27, 2022. The contents of which are incorporated herein by reference in their entirety.

BACKGROUND OF THE INVENTION

1. Field of the Invention

The present disclosure relates to a cleaning blade for an intermediate transfer medium, and an image forming apparatus.

2. Description of the Related Art

Hitherto, seamless belts have been used as components of electrophotographic image forming apparatuses for various purposes. Recent years' full-color electrophotographic image forming apparatuses employ an intermediate transfer belt method in which images developed with four colors, namely, yellow, magenta, cyan, and black, are temporarily overlaid on top of one another on an intermediate transfer belt and then collectively transferred onto a recording medium such as paper. As a cleaning unit configured to remove any residual toner adhering to the surface of the intermediate transfer belt, electrophotographic image forming apparatuses often employ a cleaning blade including: an elastic member formed of, for example, a polyurethane rubber; and a supporting member.

The cleaning blade needs to have lubricity in order to inhibit increase in the torque needed to rotate, for example, an image bearer and an intermediate transfer medium, and in order to moderate, for example, the force of friction between the cleaning blade and the intermediate transfer belt.

In recent years, in order to moderate the force of friction between the cleaning blade and an image bearer, a cleaning blade to which a lubricant containing a fluorine-based compound is applied has been used. Proposed cleaning blades use vinylidene fluoride as the fluorine-based compound contained in the lubricant (for example, see Japanese Unexamined Patent Application Publication No. 2000-147972, Japanese Unexamined Patent Application Publication No. 2004-101551, Japanese Patent No. 3278733, Japanese Unexamined Patent Application Publication No. 10-214009, and Japanese Unexamined Patent Application Publication No. 06-348193). In order to impart an appropriate flexibility and an appropriate hardness to the elastic member of a cleaning blade to minimize roll-up or gouged wear of a ridgeline of a forefront end of the cleaning blade, a surface hardness of a proposed cleaning blade, expressed by Martens hardness, is set to from 1.0 N/mm$^2$ through 15.0 N/mm$^2$ at a location having a distance of 20 μm from the ridgeline of the forefront end of the elastic member (for example, see Japanese Unexamined Patent Application Publication No. 2017-16083). Moreover, in order to improve slidability of a cleaning blade, a dispersion liquid obtained by dispersing polymethacrylic acid (PMMA) particles in a fluorine-based solvent is applied to a proposed cleaning blade (for example, see Japanese Patent No. 2853598).

SUMMARY OF THE INVENTION

According to an embodiment, a cleaning blade for an intermediate transfer medium is a cleaning blade of which the cleaning target is an intermediate transfer medium. The cleaning blade for an intermediate transfer medium includes an edge layer and a coating layer. The coating layer provided on a forefront end of the edge layer at which the edge layer contacts the intermediate transfer medium contains a first fluorine-based resin and a second fluorine-based resin incompatible with the first fluorine-based resin. The cleaning blade for an intermediate transfer medium has a Martens hardness of 0.5 N/mm$^2$ or greater and 3 N/mm$^2$ or less at a location having a distance of 20 μm from a ridgeline of the forefront end of the edge layer.

BRIEF DESCRIPTION OF THE DRAWINGS

Other objects and further features of the present invention will be apparent from the following detailed description when read in conjunction with the accompanying drawings, in which.

DESCRIPTION OF THE PREFERRED EMBODIMENTS

Figure 1:
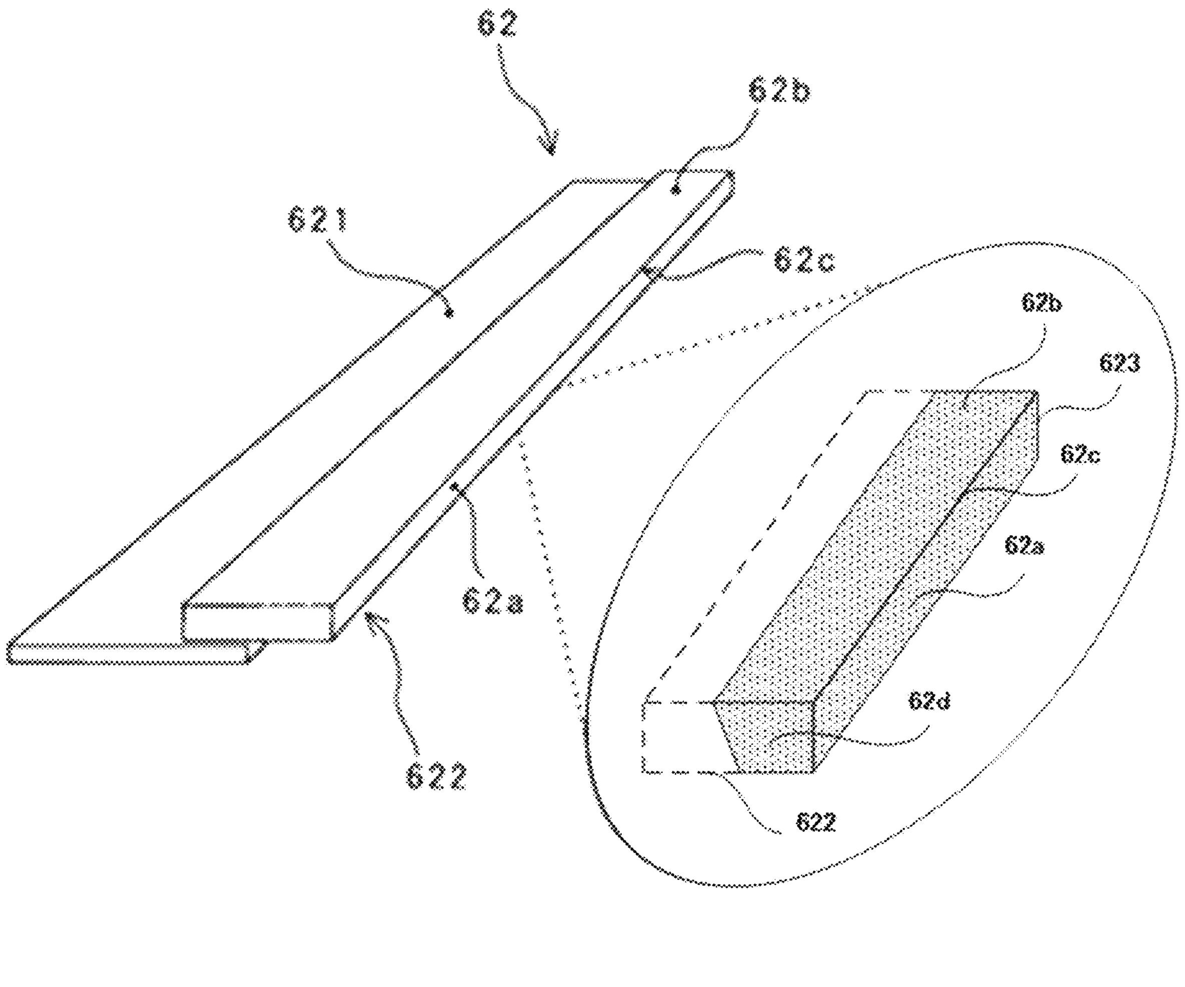
FIG. 1 is a schematic oblique view illustrating an example of a cleaning blade of the present disclosure.

In the following, embodiments of the present invention will be described with reference to the accompanying drawings.

According to the present disclosure, it is an object to provide a cleaning blade for an intermediate transfer medium, the cleaning blade being able to inhibit increase in the torque even immediately after use of an image forming apparatus is started, and to obtain a good cleaning performance.

According to the present disclosure, it is possible to provide a cleaning blade for an intermediate transfer medium, the cleaning blade being able to inhibit increase in the torque even immediately after use of an image forming apparatus is started, and to obtain a good cleaning performance.

The details of the present disclosure will be described below.

(Cleaning Blade for Intermediate Transfer Medium)

A cleaning blade for an intermediate transfer medium of the present disclosure is a cleaning blade of which the cleaning target is an intermediate transfer medium. The cleaning blade for an intermediate transfer medium includes an edge layer and a coating layer. The coating layer provided on a forefront end of the edge layer at which the edge layer contacts the intermediate transfer medium contains a first fluorine-based resin and a second fluorine-based resin incompatible with the first fluorine-based resin. The cleaning blade for an intermediate transfer medium has a Martens hardness of 0.5 $N/mm^2$ or greater and 3 $N/mm^2$ or less at a location having a distance of 20 μm from a ridgeline of the forefront end of the edge layer. The cleaning blade may further include other members as needed.

The cleaning blade for an intermediate transfer medium of the present disclosure is a cleaning blade configured to remove a residue adhering to the intermediate transfer medium by contacting the surface of the intermediate transfer medium.

In the present specification, the cleaning blade for an intermediate transfer medium may be referred to as a "cleaning blade".

The residue is not particularly limited so long as the residue is adhering to the surface of the intermediate transfer medium and is a target to be removed by the cleaning blade. Examples of the residue include a toner, a lubricant, inorganic particles, organic particles, paper dust, litter, and dust, and mixtures of these.

With a cleaning unit employing an existing cleaning blade, there has been a problem that the friction generated when the cleaning blade and the intermediate transfer medium contact each other increases the torque needed to rotate the intermediate transfer medium, and stops the rotation of the intermediate transfer medium. There has also been a problem that the friction also wears a portion of the cleaning blade that contacts the intermediate transfer medium, to roll up the cleaning blade or allow a toner to slip through the cleaning blade, resulting in a poor cleaning performance.

In order to improve the slidability of the cleaning blade and inhibit roll-up of the cleaning blade and increase in the torque, a method (touch-up) of applying, for example, a metal soap such as zinc stearate, or polymethacrylic acid (PMMA) particles to the forefront end of the cleaning blade as a lubricant is widely used. Typically, a toner gradually becomes caught between the cleaning blade and the intermediate transfer medium along with actuation of an image forming apparatus, and the caught toner functions as a lubricant. Hence, the lubricant needs only to exhibit lubricity during a short period of time from when the image forming apparatus is actuated until when the behavior of the cleaning blade stabilizes. However, there is a problem that the particles contained in existing lubricants have a weak attaching force with respect to the base material of the cleaning blade, and are detached from the cleaning blade before the behavior of the cleaning blade stabilizes.

It is known that "inhibition of increase in the torque" and "improvement in the cleaning performance" are in a trade-off relationship with each other.

For example, when a portion of the cleaning blade that contacts the intermediate transfer medium is smoothed by application of, for example, a lubricant to that portion in order to inhibit increase in the torque, slip-through of a toner occurs and the cleaning performance worsens. When the force of friction is increased by roughening of the portion of the cleaning blade that contacts the intermediate transfer medium in order to improve the cleaning performance, the torque increases.

Accordingly, it has been difficult to inhibit increase in the torque and to improve the cleaning performance at the same time.

As a result of earnest studies, the present inventors have found it possible to inhibit detachment of particles from a coating layer, by forming the coating layer by applying to the cleaning blade, a dispersion liquid in which particles are dispersed in a mixture of a solvent and a binder component, instead of a dispersion liquid in which particles are dispersed only in a solvent. The present inventors have also found it possible to inhibit roll-up of the cleaning blade and increase in the torque for the intermediate transfer medium by using slidable fluorine-based materials as the particles and the binder component.

The present inventors have also found it possible to obtain a sliding effect without inhibiting the cleaning function when the Martens hardness at a location having a distance of 20 μm from the ridgeline of the forefront end of the edge layer is 0.5 $N/mm^2$ or greater and 3 $N/mm^2$ or less.

Hence, according to the present disclosure, a cleaning blade for an intermediate transfer medium of which the cleaning target is an intermediate transfer medium, can qualify as a cleaning blade that is able to inhibit increase in the torque even immediately after use of an image forming apparatus is started, and to exhibit a good cleaning performance, provided that the cleaning blade for an intermediate transfer medium includes an edge layer and a coating layer, the coating layer provided on a forefront end of the edge layer at which the edge layer contacts the intermediate transfer medium contains a first fluorine-based resin and a second fluorine-based resin incompatible with the first fluorine-based resin, and the cleaning blade for an intermediate transfer medium has a Martens hardness of 0.5 $N/mm^2$ or greater and 3 $N/mm^2$ or less at a location having a distance of 20 μm from a ridgeline of the forefront end of the edge layer.

<Coating Layer>

The coating layer contains a first fluorine-based resin and a second fluorine-based resin incompatible with the first fluorine-based resin, and may further contain other components as needed.

The coating layer represents a layer provided on one end of a blade base described below in the peripheral side surfaces of the blade base, the one end being used as a forefront end of the cleaning blade.

The coating layer may be formed on at least a part of the blade base, the part including a contacting side of the blade base, and the contacting side being a side along which the cleaning blade and the intermediate transfer medium contact each other. The coating layer may be formed all along the contacting side, and may be formed on all surfaces of the blade base. Among these options, it is preferable that the coating layer be formed all along the contacting side.

A surface region of the blade base on which the coating layer is not provided may be referred to as a "non-coated region".

In the present disclosure, "incompatibility" represents a property that a plurality of substances that are mixed do not completely immingle with each other due to the presence of an interface between the substances. "Compatibility" represents a property that a plurality of substances that are mixed immingle with each other without an interface between the substances.

In the present disclosure, an "incompatible state" is a state in which an interface is present between a first fluorine-based resin and a second fluorine-based resin, and may be a state in which the first fluorine-based resin and the second fluorine-based resin are partially compatibilized.

In one form of an incompatible state, it is preferable that the coating layer has a sea-island structure.

The sea-island structure represents a structure in which one component contained in the coating layer formed on the cleaning blade is present in the shapes of "islands (hereinafter, may be referred to as domains)" in a "sea", when a continuous layer formed of another component contained in the coating layer is expressed as a "sea (hereinafter, may be referred to as a matrix)".

The sea-island structure of the present disclosure represents a state in which the first fluorine-based resin, which constitutes the domains, and the second fluorine-based resin, which constitutes the matrix, are incompatible and there is no compatibilized portion.

When the coating layer has the sea-island structure, it is preferable that the domains of the sea-island structure be particles.

The average thickness of the coating layer of the cleaning blade is preferably 2 μm or greater and 10 μm or less.

When the average thickness of the coating layer is 2 μm or greater, a sufficient sliding effect can be obtained. When the average thickness of the coating layer is 10 μm or less, it is possible to inhibit detachment of the coating layer.

As the average thickness of the coating layer, it is possible to employ an average of thickness measurements (μm) obtained at three or more locations of the coating layer.

The locations of the coating layer at which the average thickness is measured are not particularly limited. Examples of the locations include locations each having a distance of 20 μm from either of any pair of opposite ends of the coating layer, and the centers of the coating layer between any pair of opposite ends of the coating layer.

The average thickness of the coating layer can be measured by a method of scraping a part of the coating layer with, for example, a spatula or a cotton swab, and subjecting the scraped part to profilometry using a three-dimensional measuring instrument such as a contact-type surface roughness tester (SURFTEST SJ-500: available from Mitutoyo Corporation) or a laser microscope (LEXT OLS4100: available from Olympus Corporation).

One embodiment and another embodiment of the cleaning blade of the present disclosure will be described with reference to the drawings. Uses of the cleaning blade of the present disclosure are not limited to these embodiments.

The same components are denoted by the same reference numerals in the drawings, and any redundant descriptions for the same components may be skipped. For example, the numbers, positions, and shapes of the components are not limited to those in the embodiments, and may be, for example, any numbers, positions, and shapes that are suitable for carrying out the present disclosure.

FIG. 1 includes a schematic oblique view illustrating an embodiment of the cleaning blade of the present disclosure, and an enlarged view of a contacting portion and its surrounding portion. A cleaning blade 62 is formed of: a flat plate-shaped cleaning blade supporting member 621 made of a stiff material such as a metal or a hard plastic; and a flat plate-shaped cleaning blade base 622 of which one end is joined to the cleaning blade supporting member 621 and that has a free end having a predetermined length at the opposite end. The cleaning blade base 622 is secured to one end of the cleaning blade supporting member 621 by, for example, an adhesive agent, and the opposite end of the cleaning blade supporting member 621 is cantilevered on a cleaning device case. The cleaning blade base 622 has a cleaning blade forefront-end surface 62*a*, a cleaning blade lower surface 62*b*, a cleaning blade contacting portion 62*c*, which is one end of the cleaning blade base 622 at the free-end side, and a cleaning blade side surface 62*d*, and has the coating layer 623 on at least a part of the cleaning blade base 622, the part including the contacting side of the cleaning blade contacting portion 62*c*.

The cleaning blade 62 has the cleaning blade contacting portion 62*c* in a manner that the cleaning blade contacting portion 62*c* contacts the surface of the intermediate transfer medium along a longer dimension of the cleaning blade 62.

Figure 2:
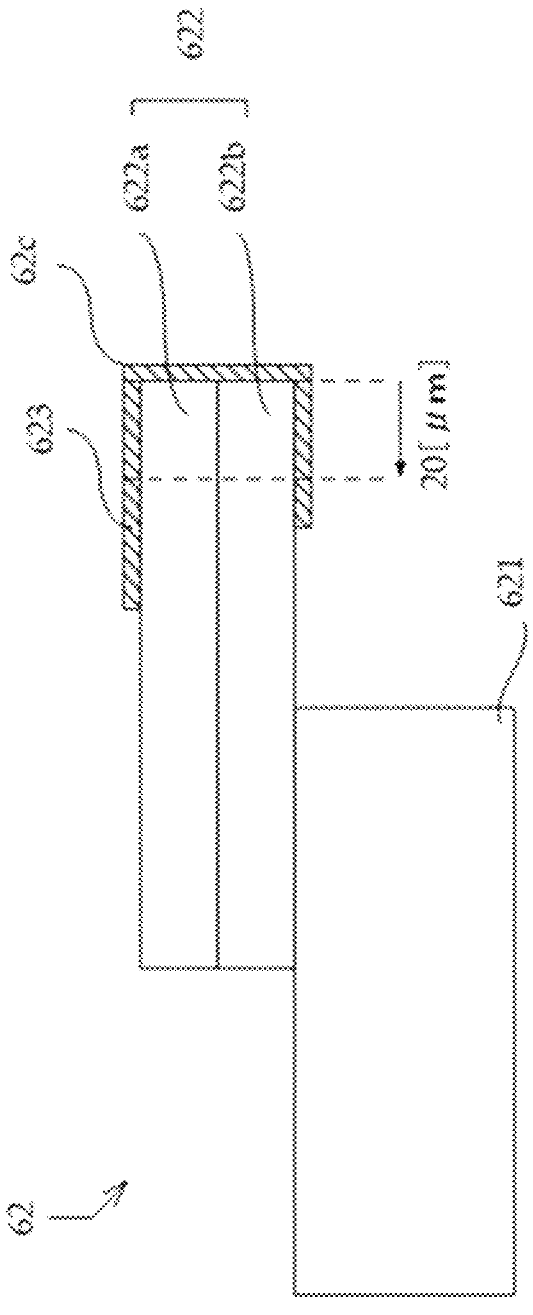
FIG. 2 is a schematic cross-sectional view illustrating another example of a cleaning blade of the present disclosure.

FIG. 2 is a schematic cross-sectional view illustrating another embodiment of the cleaning blade of the present disclosure. A cleaning blade 62 is formed of a cleaning blade supporting member 621 and a cleaning blade base 622. The cleaning blade base 622 has an edge layer 622*a* and a base layer 622*b* both having elasticity, a contacting portion 62*c*, and a coating layer 623 on at least a part of the cleaning blade base 622, the part including a contacting side of the contacting portion 62*c*. FIG. 2 does not illustrate a cleaning blade forefront-end surface 62*a*, a cleaning blade lower surface 62*b*, and a cleaning blade side surface 62*d*.

<<First Fluorine-Based Resin>>

A fluorine-based resin of the present disclosure represents a resin containing fluorine in a molecule. As the fluorine-based resin, an olefin polymer containing fluorine is preferable, and the olefin polymer of which a hydrogen atom is replaced with a fluorine atom is more preferable.

According to an aspect of the present disclosure, it is preferable that the first fluorine-based resin be the domains of the sea-island structure of the coating layer.

It is preferable to select the kind and the addition amount of the first fluorine-based resin with respect to those of the second fluorine-based resin described below in a manner that the first fluorine-based resin becomes the domains.

The shape of the domains is not particularly limited, may be appropriately selected in accordance with the intended purpose, and may be a regular shape or an irregular shape. Of these shapes, a regular shape is preferable.

When the shape of the domains is a regular shape, a spherical shape is preferable.

When the shape of the domains is a spherical shape, a particle shape is preferable.

Such a shape is preferable because it is possible to minimize troubles such as damage to the intermediate transfer medium or to the blade base of the cleaning blade by a fluorine-based resin that may be detached from the coating layer.

The volume average particle diameter (50% volume-based diameter, median diameter) of the first fluorine-based resin is not particularly limited, may be appropriately selected in accordance with the intended purpose, and is preferably 0.1 μm or greater and 1 μm or less, more preferably 0.5 μm or less, and yet more preferably 0.3 μm or less. When the volume average particle diameter of the first fluorine-based resin is 1 μm or less, it is possible to minimize a drawback that the first fluorine-based resin has an increased tendency of subsiding in a solvent and a reduced tendency of being stably dispersed in the solvent. When the volume average particle diameter of the first fluorine-based resin is 0.5 μm or less, the first fluorine-based resin can be more stably dispersed in a non-aqueous solvent.

The method for measuring the volume average particle diameter (50% volume-based diameter, median diameter) is not particularly limited and may be appropriately selected in accordance with the intended purpose. The volume average particle diameter can be measured by, for example, a laser diffraction/scattering method, a dynamic light scattering method, and an imaging method.

Specific examples of the method for measuring the volume average particle diameter include a method of measuring the volume average particle diameter of the particles collected from the coating layer of the cleaning blade by the laser diffraction/scattering method using MICROTRAC (available from Nikkiso Co., Ltd.), and a method of measuring the volume average particle diameter by directly observing the particles on the cleaning blade using a scanning electron microscope (SEM).

There is almost no volume average particle diameter difference between the particles added in the dispersion liquid to be applied to the cleaning blade and the particles present in the coating layer.

The content of the first fluorine-based resin in the coating layer is not particularly limited, may be appropriately selected in accordance with the intended purpose, and is preferably 4% by mass or greater and 8% by mass or less and more preferably 4.5% by mass or greater and 5.5% by mass or less relative to the whole mass of the coating layer because a sliding effect can be obtained. The sliding effect that can be obtained by the first fluorine-based resin being contained in the coating layer becomes the maximum when the content of the first fluorine-based resin is 8% by mass relative to the whole mass of the coating layer. When the content of the first fluorine-based resin in the coating layer is 4% by mass or greater relative to the whole mass of the coating layer, a sufficient sliding effect can be obtained.

The first fluorine-based resin is not particularly limited and may be appropriately selected in accordance with the intended purpose. Examples of the first fluorine-based resin include polytetrafluoroethylene (PTFE), fluoroethylene-propylene copolymers (FEP), perfluoroalkoxy polymers (PFA), chlorotrifluoroethylene copolymers (CTFE), tetrafluoroethylene-chlorotrifluroethylene copolymers (TFE/CTFE), ethylene-chlorotrifluoroethylene copolymers (ECTFE), and polychlorotrifluoroethylene (PCTFE). Among these resins, polytetrafluoroethylene (PTFE) is preferable in terms of better improving the slidability of the cleaning blade.

The polytetrafluoroethylene (PTFE) may be an appropriately synthesized product or a commercially available product.

Examples of the commercially available product of the polytetrafluoroethylene (PTFE) include DYNEON TF MICROPOWDER TF-9201Z and DYNEON TF MICROPOWDER TF-9207Z (both available from 3M Japan Co., Ltd.), NANO FLON119N and FLUORO E (both available from Nippon Dacro Shamroc Co. Ltd.), TLP10E-1 (available from Chemours-Mitsui Fluoroproducts Co., Ltd.), KTL-500F (available from Kitamura Limited), and ALGOFLON L203F (available from SOLVAY).

<<Second Fluorine-Based Resin>>

In the present disclosure, when the coating layer contains the second fluorine-based resin, the attaching force of the first fluorine-based resin with respect to the cleaning blade base is improved, and detachment of the coating layer can be inhibited. Therefore, it is possible to inhibit roll-up of the cleaning blade or increase in the torque.

According to an aspect of the present disclosure, it is preferable that the second fluorine-based resin be the matrix of the sea-island structure of the coating layer.

It is preferable to select the kind and the addition amount of the second fluorine-based resin with respect to those of the first fluorine-based resin in a manner that the second fluorine-based resin becomes the matrix.

The second fluorine-based resin is not particularly limited and may be appropriately selected in accordance with the intended purpose so long as the first fluorine-based resin can be uniformly and stably dispersed in the second-fluorine based resin. Examples of the second fluorine-based resin include vinylidene fluoride (VdF), hexafluoropropylene (HFP), and tetrafluoroethylene (TFE). Among these resins, copolymers in which these resins are combined are preferable and a VdF-HFP-TFE terpolymer is more preferable in terms of impartment of lubricity and adhesiveness with the blade base.

The composition ratio VdF:HFP:TFE in the terpolymer when it is assumed that they are in their respective monomer forms is preferably from 30% by mole through 80% by mole:from 10% by mole through 35% by mole:from 5% by mole through 35% by mole.

As the second fluorine-based resin, a mixture of the second fluorine-based resin with a fluorine-based oil may be used.

Mixing with the fluorine-based oil can better improve also the sliding function, not only the binder function.

Examples of the fluorine-based oil include tetrafluoroethylene (TFE) oligomers and fluorine-based oils containing perfluoroether in the main skeleton.

When the mixture of the second fluorine-based resin with the fluorine-based oil is used as the second fluorine-based resin, the content of the second fluorine-based resin is preferably 90% by mass or greater and 99% by mass or less and more preferably 95% by mass or greater and 98% by mass or less relative to the whole mass of the mixture in terms of inhibiting contamination of, for example, the intermediate transfer medium due to bleed-out of the fluorine-based oil.

The fluorine-based oil containing perfluoroether in the main skeleton is not particularly limited and may be appropriately selected in accordance with the intended purpose so long as the fluorine-based oil has slidability and does not disturb dispersion of the fluorine-based resin. The average molecular weight of the fluorine-based oil is preferably from 2,000 through 3,500 in terms of kinematic viscosity.

The same material or different materials may be used for the first fluorine-based resin and the second fluorine-based resin of the present disclosure. When using the same material, it is possible to produce the coating layer by exercising ingenuity in the producing method so the first fluorine-based resin and the second fluorine-based resin become incompatible with each other. For example, by adding the second fluorine-based resin to the first fluorine-based resin that has been cured previously, and then curing them, it is possible to produce the coating layer in which an interface is formed between the first fluorine-based resin and the second fluorine-based resin and the first fluorine-based resin and the second fluorine-based resin are partially incompatible with each other. It is also possible to produce the coating layer by mixing the first fluorine-based resin to which a hydrophilic substituent is added, with the second fluorine-based resin to which a hydrophobic substituent is added.

<<Any Other Component (A)>>

The any other component (A) is not particularly limited and may be appropriately selected in accordance with the intended purpose. Examples of the any other component (A) include particles other than the particles of the fluorine-based resin.

The particles other than the particles of the fluorine-based resin are not particularly limited and may be appropriately selected in accordance with the intended purpose. Examples of the particles other than the particles of the fluorine-based resin include particles of inorganic compounds, acrylic-based resins, styrene-based resins, and vinyl-based resins.

Examples of the particles of inorganic compounds include silica, alumina, and zirconia.

One of these kinds of particles may be used alone or two or more of these kinds of particles may be used in combination.

The shape of the particles other than the particles of the fluorine-based resin is not particularly limited, may be appropriately selected in accordance with the intended purpose, and is preferably a spherical shape. A spherical shape is preferable because the particles other than the particles of the fluorine-based resin having a spherical shape can inhibit troubles such as causing damage to the intermediate transfer medium or to the blade base of the cleaning blade when the particles are detached from the coating layer.

The volume average particle diameter (50% volume-based diameter, median diameter) of the particles other than the particles of the fluorine-based resin is not particularly limited, may be appropriately selected in accordance with the intended purpose, and is preferably 0.1 μm or greater and 1 μm or less, more preferably 0.5 μm or less, and yet more preferably 0.3 μm or less. When the volume average particle diameter of the particles other than the particles of the fluorine-based resin is 1 μm or less, it is possible to minimize a drawback that the particles other than the particles of the fluorine-based resin have an increased tendency of subsiding in a solvent and a reduced tendency of being stably dispersed in the solvent. When the volume average particle diameter of the particles other than the particles of the fluorine-based resin is 0.5 μm or less, the particles other than the particles of the fluorine-based resin can be more stably dispersed in a non-aqueous solvent.

The method for measuring the volume average particle diameter (50% volume-based diameter, median diameter) is not particularly limited and may be appropriately selected in accordance with the intended purpose. The volume average particle diameter can be measured by, for example, a laser diffraction/scattering method, a dynamic light scattering method, and an imaging method.

Specific examples of the method for measuring the volume average particle diameter include a method of measuring the volume average particle diameter of the particles collected from the coating layer of the cleaning blade by the laser diffraction/scattering method using MICROTRAC (available from Nikkiso Co., Ltd.), and a method of measuring the volume average particle diameter by directly observing the particles on the cleaning blade using a scanning electron microscope (SEM).

The method for producing the coating layer is not particularly limited and may be appropriately selected in accordance with the intended purpose. For example, it is possible to obtain the coating layer by adding and mixing the first fluorine-based resin with a mixture (a second fluorine-based resin dispersion) of a solvent and the second fluorine-based resin, and applying the obtained particle dispersion to the blade base of the cleaning blade.

The solvent is not particularly limited and may be appropriately selected in accordance with the intended purpose. Examples of the solvent include fluorine-containing organic solvents.

Examples of the fluorine-containing organic solvents include hydrofluoroether (HFE), perfluorocarbon (PFC), and perfluoroether (PFE).

One of these solvents may be used alone or two or more of these solvents may be used in combination.

In the present disclosure, the average particle diameter of the particles contained in the second fluorine-based resin dispersion measured by a dynamic light scattering method (i.e., an average particle diameter obtained from a scattering intensity distribution by a cumulant approach) is preferably 1 μm or less, more preferably 0.5 μm or less, and yet more preferably 0.3 μm or less because a uniform dispersion can be obtained.

Typically, even when particles having a volume average particle diameter of 1 μm or less are used, the particles flocculate and form secondary particles, and become particles (secondary particles) having a volume average particle diameter of 1 μm or greater. By dispersing the particles that have flocculated and formed secondary particles in a manner that the particle diameter becomes 1 μm or less, it is possible to make the viscosity of the second fluorine-based resin dispersion low, and to obtain a dispersion that remains stable through a long-term storage.

The dispersing method is not particularly limited and may be appropriately selected in accordance with the intended purpose. Examples of the method include a method using a disperser such as an ultrasonic disperser, a three-roll mill, a ball mill, a bead mill, and a jet mill.

The method for forming the coating layer is not particularly limited and may be appropriately selected in accordance with the intended purpose. Examples of the method include a dipping process of sinking the whole or a part of the blade base of the cleaning blade into the particle dispersion and treating it with the particle dispersion. Other than the dipping, coating methods such as spray coating and a dispenser may be employed.

<Blade Base>

In the present specification, the blade base of the cleaning blade may be referred to as a "blade base" or a "base".

The shape of the blade base may be appropriately selected in accordance with the intended purpose, so long as the blade base has a structure that can remove the residue on the intermediate transfer medium. It is preferable that the contacting side of the contacting portion of the blade base at which the blade base contacts the intermediate transfer medium be a straight line. Examples of the shape of the blade base include a plate shape.

The structure of the blade base is not particularly limited and may be appropriately selected in accordance with the intended purpose. Examples of the structure of the blade base include a single layer structure, a laminate structure, and a laminate structure in which a plurality of members are combined. Among these structures, a single layer structure and a laminate structure in which a plurality of members are laminated are preferable because it is easy to manufacture these structures into the cleaning blade.

When the blade base has a laminate structure, a layer contacting the intermediate transfer medium may be referred to as the edge layer, and a layer that is not the edge layer may be referred to as the base layer. When the blade base includes a single layer, the blade base includes only the edge layer.

It is preferable that the plurality of members in the laminate structure vary in Martens hardness.

The material of the blade base is not particularly limited and may be appropriately selected in accordance with the intended purpose. An elastic material having an appropriate elasticity and an appropriate hardness is preferable in terms of minimizing wear of the blade base and sufficiently removing the residue on the intermediate transfer medium.

The elastic material is not particularly limited and may be appropriately selected in accordance with the intended purpose so long as the elastic material has a high elasticity. Examples of the elastic material include polyurethane rubbers, silicone rubbers, fluorine rubbers, nitrile rubbers (NBR), and ethylene propylene diene rubbers (EPDM). Among these elastic materials, polyurethane rubbers are preferable in terms of durability and anti-contamination.

The size of the blade base is not particularly limited and may be appropriately selected in accordance with the size of the intermediate transfer medium.

The Martens hardness of the polyurethane rubber in the cleaning blade of the present disclosure is not particularly limited, may be appropriately selected in accordance with the intended purpose, and is preferably 0.5 $N/mm^2$ or greater and 2 $N/mm^2$ or less. When the Martens hardness of the polyurethane rubber in the cleaning blade is in the preferable range, it is possible to overcome troubles such as a poor cleaning performance due to a tendency that a blade linear load cannot be obtained and the area over which the contacting portion contacts the intermediate transfer medium becomes expansive, and chipping of the cleaning blade that may occur when the blade base is excessively hard.

The method for producing the blade base is not particularly limited and may be appropriately selected in accordance with the intended purpose. For example, it is possible to obtain the blade base by preparing a polyurethane prepolymer using a polyol compound and a polyisocyanate compound, adding a curing agent, and as needed, a curing catalyst to the polyurethane prepolymer, centrifugally casting the polyurethane prepolymer in a predetermined die, aging (curing) the resulting product by leaving it at normal temperature, and cutting the resulting product into a plate shape having predetermined dimensions.

The polyol compound is not particularly limited and may be appropriately selected in accordance with the intended purpose. Examples of the polyol compound include high-molecular weight polyols and low-molecular-weight polyols.

Examples of the high-molecular-weight polyols include: polyester polyols, which are condensates of alkylene glycols and aliphatic dibasic acids; polyester polyols such as polyester polyols between alkylene glycols and adipic acid, such as ethylene adipate ester polyol, butylene adipate ester polyol, hexylene adipate ester polyol, ethylene propylene adipate ester polyol, ethylene butylene adipate ester polyol, and ethylene neopentylene adipate ester polyol; polycaprolactone-based polyols such as polycaprolactone ester polyols obtained by ring-opening polymerization of caprolactone; and polyether-based polyols such as poly(oxytetramethylene)glycol and poly(oxypropylene)glycol.

One of these high-molecular-weight polyols may be used alone or two or more of these high-molecular-weight polyols may be used in combination.

Examples of the low-molecular-weight polyols include: divalent alcohols such as 1,4-butanediol, ethylene glycol, neopentyl glycol, hydroquinone-bis(2-hydroxyethyl)ether, 3,3'-dichloro-4,4'-diaminodiphenylmethane, and 4,4'-diaminodiphenylmethane; and trivalent or higher multivalent alcohols such as 1,1,1-trimethylolpropane, glycerin, 1,2,6-hexanetriol, 1,2,4-butanetriol, trimethylolethane, 1,1,1-tris(hydroxyethoxymethyl)propane, diglycerin, and pentaerythritol.

One of these low-molecular-weight polyols may be used alone or two or more of these low-molecular-weight polyols may be used in combination.

The polyisocyanate compound is not particularly limited and may be appropriately selected in accordance with the intended purpose. Examples of the polyisocyanate compound include methylene diphenyl diisocyanate (MDI), tolylene diisocyanate (TDI), xylylene diisocyanate (XDI), naphthylene 1,5-diisocyanate (NDI), tetramethyl xylene diisocyanate (TMXDI), isophorone diisocyanate (IPDI), hydrogenated xylylene diisocyanate (H6XDI), dicyclohexylmethane diisocyanate (H12MDI), hexamethylene diisocyanate (HDI), dimer acid diisocyanate (DDI), norbornene diisocyanate (NBDI), and trimethyl hexamethylene diisocyanate (TMDI).

One of these polyisocyanate compounds may be used alone or two or more of these polyisocyanate compounds may be used in combination.

The curing agent is not particularly limited and may be appropriately selected in accordance with the intended purpose. Examples of the curing agent include amines and alcohols.

One of these curing agents may be used alone or two or more of these curing agents may be used in combination.

For example, the curing agent is used to adjust the hardness of the blade base.

The curing catalyst is not particularly limited and may be appropriately selected in accordance with the intended purpose. Examples of the curing catalyst include 2-methyl imidazole and 1,2-dimethyl imidazole.

The content of the curing catalyst is not particularly limited, may be appropriately selected in accordance with the intended purpose, and is preferably 0.01% by mass or greater and 0.5% by mass or less and more preferably 0.05% by mass or greater and 0.3% by mass or less relative to the total of the masses of the prepolymer and the curing agent.

The modulus of rebound resilience of the blade base according to JIS K6255 is not particularly limited, may be appropriately selected in accordance with the intended purpose, and is preferably from 10% through 80% at 23° C.

When the modulus of rebound resilience is in the preferable range, it is possible to overcome troubles such as a poor cleaning performance due to failure of the blade base, which is inflexible outside the preferable range, to follow sway or roughness of the intermediate transfer medium, and blade sounding (noise) that may occur when the blade base rebounds too strongly.

For example, the modulus of rebound resilience of the blade base can be measured at 23° C. using RESILIENCE TESTER No. 221 available from Toyo Seiki Seisaku-sho, Ltd. according to JIS K6255 standard.

<Martens Hardness>

When the cleaning blade of the present disclosure has a Martens hardness of 0.5 $N/mm^2$ or greater and 3 $N/mm^2$ or less at a location having a distance of 20 μm from the ridgeline of the forefront end of the edge layer, a sufficient sliding effect can be obtained.

The Martens hardness of the cleaning blade of the present disclosure at a location having a distance of 20 μm from the ridgeline of the forefront end of the edge layer is preferably 1.0 $N/mm^2$ or greater and 2.6 $N/mm^2$ or less because a good sliding effect can be obtained.

When the Martens hardness of the cleaning blade at a location having a distance of 20 μm from the ridgeline of the forefront end of the edge layer is 0.5 $N/mm^2$ or greater, advantageously, it is possible to overcome a problem that a desired sliding effect cannot be obtained because the first fluorine-based resin particles and the second fluorine-based resin particles do not sufficiently adhere to the edge layer. When the Martens hardness of the cleaning blade at a location having a distance of 20 μm from the ridgeline of the forefront end of the edge layer is 3 $N/mm^2$ or less, advantageously, it is possible to overcome a problem that the first fluorine-based resin particles and the second fluorine-based resin particles adhere to the edge layer more than necessary and disturb the cleaning function.

In the present disclosure, the Martens hardness is measured from a product processed into a cleaning blade.

The method for measuring the Martens hardness (HM) is not particularly limited and may be appropriately selected in accordance with the intended purpose. For example, it is possible to measure the Martens hardness by indenting a Berkowitz indenter into the location of measurement for 10 seconds under a load of 1,000 μN, holding the Berkowitz indenter there for 5 seconds, and withdrawing the Berkowitz indenter in 10 seconds at the same loading rate, using a nano indenter (ENT-3100, available from Elionix Inc.) according to ISO14577.

The location of the base layer at which the Martens hardness is measured is not particularly limited, and may be a location having a distance of 20 μm from an end of the base layer because of ease of measurement.

The Martens hardness represents the average of measurements obtained at from 4 through 6 points included in each location of measurement.

<Intermedium Transfer Medium>

The intermediate transfer medium may contain a resin and an electrical resistance adjusting agent, and may contain any other component (B) as needed.

The intermediate transfer medium is not particularly limited and may be appropriately selected in accordance with the intended purpose so long as a toner image obtained by developing a latent image formed on an image bearer can be transferred onto the intermediate transfer medium. Examples of the intermediate transfer medium include an intermediate transfer belt and a secondary transfer belt.

—Resin—

The resin contained in the intermediate transfer medium is not particularly limited and may be appropriately selected in accordance with the intended purpose. Examples of the resin include fluorine-based resins such as polyvinylidene fluoride (PVDF) and ethylene tetrafluoroethylene (ETFE), polyimide resins, and polyamide imide resins. Among these resins, polyimide resins and polyamide imide resins are preferable in terms of mechanical strength (high elasticity) and heat resistance.

The polyamide resins and the polyamide imide resins are not particularly limited and may be appropriately selected in accordance with the intended purpose. For example, general commodity resins available from manufacturers such as Du Pont-Toray Co., Ltd., Ube Corporation, New Japan Chemical Co., Ltd., JSR Corporation, Unitika Ltd., I.S.T Corporation, Hitachi Kasei Kogyo KK, Toyobo Co., Ltd., and Arakawa Kagaku Kabushiki Kaisha may be used.

—Electrical Resistance Adjusting Agent—

The electrical resistance adjusting agent is not particularly limited and may be appropriately selected in accordance with the intended purpose. Examples of the electrical resistance adjusting agent include metal oxides, carbon black, ion conductive agents, and conductive polymers.

The metal oxides are not particularly limited and may be appropriately selected in accordance with the intended purpose. Examples of the metal oxides include zinc oxide, tin oxide, titanium oxide, zirconium oxide, aluminium oxide, and silicon oxide. For a better dispersibility, a surface treatment may be previously applied to the metal oxides.

The carbon black is not particularly limited and may be appropriately selected in accordance with the intended purpose. Examples of the carbon black include Ketjen black, furnace black, acetylene black, thermal black, and gas black.

The ion conductive agent is not particularly limited and may be appropriately selected in accordance with the intended purpose. Examples of the ion conductive agent include tetraalkyl ammonium salt, trialkyl benzyl ammonium salt, alkyl sulfonate salt, alkyl benzene sulfonate salt, alkyl sulfate, glycerin fatty acid ester, sorbitan fatty acid ester, polyoxyethylene alkyl amine, polyoxyethylene aliphatic alcohol ester, alkyl betaine, and lithium perchlorate.

Examples of the conductive polymer include polyparaphenylene, polyaniline, polythiophene, and polyparaphenylene vinylene.

One of these electrical resistance adjusting agents may be used alone or two or more of these electrical resistance adjusting agents may be used in combination.

The content of the electrical resistance adjusting agent in the intermediate transfer medium is not particularly limited and may be appropriately selected in accordance with the intended purpose. When the electrical resistance adjusting agent is the carbon black, the content of the electrical resistance adjusting agent is preferably 10% by mass or greater and 25% by mass or less and more preferably 15% by mass or greater and 20% by mass or less relative to the whole mass of the intermediate transfer medium. When the electrical resistance adjusting agent is the metal oxide, the content of the electrical resistance adjusting agent is preferably 1% by mass or greater and 50% by mass or less and more preferably 10% by mass or greater and 30% by mass or less relative to the whole mass of the intermediate transfer medium. When the content of the electrical resistance adjusting agent is greater than or equal to the lower limit of the preferable range, it is possible to overcome a problem that an electrical resistance adjusting effect cannot be obtained. When the content of the electrical resistance adjusting agent is less than or equal to the upper limit of the preferable range, the intermediate transfer belt can obtain a good mechanical strength.

—Any Other Component (B)—

The any other component (B) is not particularly limited and may be appropriately selected in accordance with the intended purpose. Examples of the any other component (B) include a dispersing aid, a reinforcing agent, a lubricant, a heat transfer agent, and an antioxidant.

The average thickness of the intermediate transfer medium is not particularly limited, may be appropriately selected in accordance with the intended purpose, and is preferably 30 μm or greater and 150 μm or less, more preferably 40 μm or greater and 120 μm or less, and particularly preferably 50 μm or greater and 80 μm or less. When the average thickness of the intermediate transfer medium is 30 μm or greater and 150 μm or less, there is an advantage that the intermediate transfer belt has an improved durability. It is preferable that the intermediate transfer medium has as small a thickness unevenness as possible for a higher running stability.

The method for measuring the average thickness of the intermediate transfer medium is not particularly limited and may be appropriately selected in accordance with the intended purpose. Examples of the method include measurement with a contact-type or eddy current-type film thickness meter, and a method of measuring a cross-section of a film with a scanning electron microscope (SEM).

<Other Members>

The other members are not particularly limited and may be appropriately selected in accordance with the intended purpose. Examples of the other members include a supporting member.

<<Supporting Member>>

The shape of the supporting member is not particularly limited and may be appropriately selected in accordance with the intended purpose. Examples of the shape of the supporting member include a plate shape.

The structure of the supporting member is not particularly limited and may be appropriately selected in accordance with the intended purpose.

The size of the supporting member is not particularly limited and may be appropriately selected in accordance with the size of the intermediate transfer medium.

The material of the supporting member is not particularly limited and may be appropriately selected in accordance with the intended purpose. Examples of the material of the supporting member include metals, plastics, and ceramics. Among these materials, metals are preferable in terms of strength, and steels such as stainless steel, aluminum, and phosphor bronze are more preferable.

(Image Forming Apparatus and Image Forming Method)

An image forming apparatus of the present disclosure includes a developing unit, a primary transfer unit, a secondary transfer unit, and a cleaning unit, and may further include other units as needed.

The cleaning unit includes the cleaning blade for an intermediate transfer medium of the present disclosure.

An image forming method relating to the present disclosure includes a developing step, a primary transfer step, a secondary transfer step, and a cleaning step, and may further include other steps as needed.

The cleaning step is performed using the cleaning blade for an intermediate transfer medium of the present disclosure.

The image forming method relating to the present disclosure can be suitably performed by the image forming apparatus of the present disclosure. The developing step can be performed by the developing unit. The primary transfer step can be performed by the primary transfer unit. The secondary transfer step can be performed by the secondary transfer unit. The cleaning step can be performed by the cleaning unit. The other steps can be performed by the other units.

<Developing Step and Developing Unit>

The developing step is a step of developing a latent image formed on an image bearer capable of bearing a toner image, with a toner, and is performed by the developing unit.

The developing unit is not particularly limited and may be appropriately selected in accordance with the intended purpose so long as the developing unit can develop the latent image to a toner image. Examples of the developing unit include a developing unit that includes at least a developing device containing the toner and capable of applying the toner to the latent image in a contacting manner or a contactless manner.

The developing device may be a dry developing type or a wet developing type, or a single-color developing device or a multiple-color developing device. Examples of the developing device include a developing device that includes: a stirring device configured to apply friction and stir the toner to charge the toner; and a rotatable magnet roller.

In the developing device, for example, the toner is stirred while being mixed with a carrier as needed, and gets charged by the stirring friction and borne on the surface of the rotating magnet roller in a chain-like form, to form a magnetic brush.

The magnet roller is disposed near the image bearer. Therefore, the toner constituting the magnetic brush formed on the surface of the magnet roller is partially transferred to the surface of the image bearer by an electrical suction force of the latent image. As a result, the latent image is developed with the toner, and the toner image is formed on the surface of the image bearer.

The toner contained in the developing device may be a developer containing the toner. The developer may be a one-component developer or a two-component developer.

The toner may also be used as a one-component magnetic or non-magnetic toner that is free of a carrier.

<Primary Transfer Step and Primary Transfer Unit, and Secondary Transfer Step and Secondary Transfer Unit>

The primary transfer step is a step of primarily transferring the toner image developed in the developing step onto the intermediate transfer medium, and is performed by the primary transfer unit.

The secondary transfer step is a step of transferring the toner image transferred onto the intermediate transfer medium onto a recording medium, and is performed by the secondary transfer unit.

As the primary transfer unit and the secondary transfer unit, for example, a unit that includes at least a transfer device configured to charge the toner image formed on the surface of the image bearer in a manner that the toner image is peeled to a recording medium is preferable.

The transfer device is not particularly limited and may be appropriately selected in accordance with the intended purpose. Examples of the transfer device include a corona transfer device using a corona discharge, a transfer belt, a transfer roller, a pressure transfer roller, and an adhesive transfer device. One, or two or more transfer devices may be used.

The recording medium is not particularly limited and may be appropriately selected in accordance with the intended purpose so long as the toner image that has not yet been fixed after being developed can be transferred onto the recording medium. A representative example of the recording medium is plain paper. However, for example, a polyethylene terephthalate (PET) base for overhead projection (OHP) may also be used.

<Cleaning Step and Cleaning Unit>

The cleaning step is a step of removing the toner remaining on the surface of the intermediate transfer medium, and is performed by the cleaning unit.

As the cleaning unit, one in which the cleaning blade of the present disclosure is secured on a supporting member is used.

The linear load that is applied on the surface of the intermediate transfer medium by the blade base of the cleaning blade of the present disclosure is not particularly limited, may be appropriately selected in accordance with the intended purpose, and is preferably 10 N/m or higher and 100 N/m or lower and more preferably 10 N/m or higher and 50 N/m or lower. When the linear load is 10 N/m or higher and 100 N/m or lower, a poor cleaning performance due to slipping of the toner through between the contacting portion of the cleaning blade and the intermediate transfer medium is less likely to occur, and roll-up of the blade base is more likely to be inhibited.

The linear load can be measured using, for example, a measuring instrument incorporating a small-size compressive load cell available from Kyowa Dengyo Co., Ltd.

Figure 3:
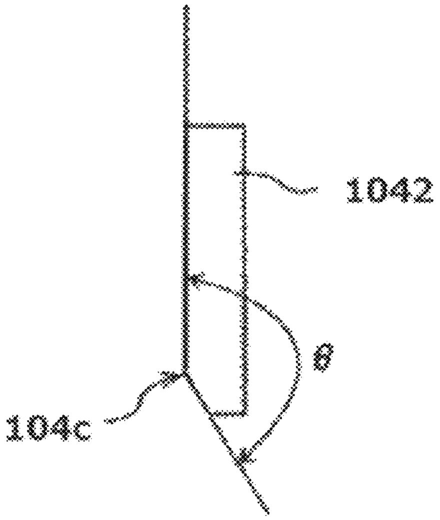
FIG. 3 is a schematic cross-sectional view illustrating an example of the shape of a forefront end of a cleaning blade of the present disclosure.

The angle (illustrated in FIG. 3) formed between the tangential line of the intermediate transfer medium and the forefront-end surface of the cleaning blade on the free end side at the contacting portion of the cleaning blade is not particularly limited, may be appropriately selected in accordance with the intended purpose, and is preferably 65° or greater and 85° or less. The angle may hereinafter be referred to as a “cleaning angle”.

When the cleaning angle is 65° or greater and 85° or less, there is an advantage that occurrence of roll-up of the blade base can be more securely inhibited and occurrence of a poor cleaning performance can be reduced.

<Other Steps and Other Units>

Examples of the other steps include a charging step, a light exposing step, a fixing step, a charge eliminating step, a recycling step, and a control step.

The charging step and the light exposing step may be collectively referred to as an electrostatic latent image forming step.

Examples of the other units include a charging unit, a light exposing unit, a fixing unit, a charge eliminating unit, a recycling unit, and a control unit.

The charging unit and the light exposing unit may be collectively referred to as an electrostatic latent image forming unit.

—Charging Step and Charging Unit—

The charging step is a step of charging the surface of the image bearer, and is performed by the charging unit.

The charging unit is not particularly limited and may be appropriately selected in accordance with the intended purpose so long as the charging unit can charge the surface of the image bearer. Examples of the charging unit include a publicly-known contact charger including, for example, a conductive or semi-conductive roller, brush, film, or rubber blade, and a contactless charger utilizing a corona discharge, such as a corotron and a scorotron.

The charging unit may have any form, such as a roller, a magnetic brush, and a fur brush. The form of the charging unit may be selected in accordance with the specifications and form of the electrophotographic image forming apparatus.

When a magnetic brush is used as the charging unit, the magnetic brush uses, for example, various kinds of ferrite particles such as Zn—Cu ferrite as the charging medium. The magnetic brush is formed of a non-magnetic conductive sleeve on which the charging medium is supported, and a magnet roll enveloped inside the conductive sleeve.

When a fur brush is used as the charging unit, a fur treated with, for example, carbon, copper sulfide, metals, or metal oxides to have conductivity is used as the material of the fur brush. The treated fur is wound around or pasted on a metal or any other cored bar that is treated to have conductivity, and can be used as a charger.

The charger is not limited to the contact charger as described above. However, a contact charger is preferable because an image forming apparatus with reduced ozone emission from a charger can be obtained.

It is preferable that the charger be disposed in contact with or without contact with the image bearer, and be configured to charge the surface of the image bearer in response to application of superimposed DC and AC voltages.

It is also preferable that the charger be a charging roller having a gap tape with respect to the image bearer and disposed near the image bearer without contact, and configured to charge the surface of the image bearer in response to application of superimposed DC and AC voltages to the charging roller.

—Light Exposing Step and Light Exposing Unit—

The light exposing step is a step of exposing the charged surface of the image bearer to light, and is performed by the light exposing unit. It is possible to perform the light exposure by exposing the surface of the image bearer to light imagewise using the light exposing unit.

The optical system involved in the light exposure is roughly classified into an analog optical system and a digital optical system.

The analog optical system is an optical system configured to directly project a subject copy on the surface of the image bearer via an optical system.

The digital optical system is an optical system configured to receive image information as an electric signal, convert the electric signal to an optical signal, and expose the image bearer to the optical signal, to form an image.

The light exposing unit is not particularly limited and may be appropriately selected in accordance with the intended purpose so long as the light exposing unit can expose the charged image bearer to light and form a latent image on the image bearer. Examples of the light exposing unit include various light exposing devices such as a copier optical system, a rod lens array system, a laser optical system, a liquid crystal shutter optical system, and an LED optical system.

In the present disclosure, a backlighting system configured to expose the back surface of the image bearer to light imagewise may also be employed.

—Fixing Step and Fixing Unit—

The fixing step is a step of fixing the toner image transferred onto the recording medium, and is performed by the fixing unit. When toners for two or more colors are used, the toners for the respective colors may be fixed separately when they are each transferred to a recording medium, or the toners for all of the colors may be fixed in an overlaid state when they have been transferred onto a recording medium.

The fixing unit is not particularly limited and may be appropriately selected in accordance with the intended purpose so long as the fixing unit can fix the toner image transferred onto the recording medium. A thermal fixing system using a publicly-known heating/pressing unit can be employed.

The heating/pressing unit is not particularly limited and may be appropriately selected in accordance with the intended purpose. Examples of the heating/pressing unit include a combination of a heating roller and a pressing roller, and a combination of a heating roller, a pressing roller, and an endless belt.

The heating temperature is not particularly limited, may be appropriately selected in accordance with the intended purpose, and is preferably from 80° C. through 200° C. As needed, for example, a publicly-known optical fixing device may be used in combination with the fixing unit.

—Charge Eliminating Step and Charge Eliminating Unit—

The charge eliminating step is a step of applying a charge-eliminating bias voltage to the image bearer to eliminate built-up charges, and is performed by the charge eliminating unit.

The charge eliminating unit is not particularly limited and may be appropriately selected in accordance with the intended purpose so long as the charge eliminating unit can apply a charge-eliminating bias voltage to the image bearer. Examples of the charge eliminating unit include a charge eliminating lamp.

—Recycling Step and Recycling Unit—

The recycling step is a step of recycling the toner removed in the cleaning step, and is performed by the recycling unit.

The recycling unit is not particularly limited and may be appropriately selected in accordance with the intended purpose. Examples of the recycling unit include a publicly-known conveying unit.

—Control Step and Control Unit—

The control step is a step of controlling each of the steps described above, and is performed by the control unit.

The control unit is not particularly limited and may be appropriately selected in accordance with the intended purpose so long as the control unit can control the operations of each unit. Examples of the control unit include devices such as a sequencer and a computer.

<Image Bearer>

For example, the structure and size of the image bearer are not particularly limited, and the image bearer may be appropriately selected from publicly-known image bearers.

The shape of the image bearer is not particularly limited and may be appropriately selected in accordance with the intended purpose. Examples of the shape of the image bearer include a drum shape and a belt shape.

The material of the image bearer is not particularly limited and may be appropriately selected in accordance with the intended purpose. Examples of the material of the image bearer include inorganic photoconductors such as amorphous silicon and selenium, and organic photoconductors (OPC) such as polysilane and phthalopolymethine.

An example of the image forming apparatus of the present disclosure will be described with reference to the drawings. The use of the cleaning blade of the present disclosure is not limited to the following embodiment.

The same components are denoted by the same reference numerals in the drawings, and any redundant descriptions for the same components may be skipped. For example, the numbers, positions, and shapes of the components are not limited to those in the embodiment, and may be, for example, any numbers, positions, and shapes that are suitable for carrying out the present disclosure.

Figure 4:
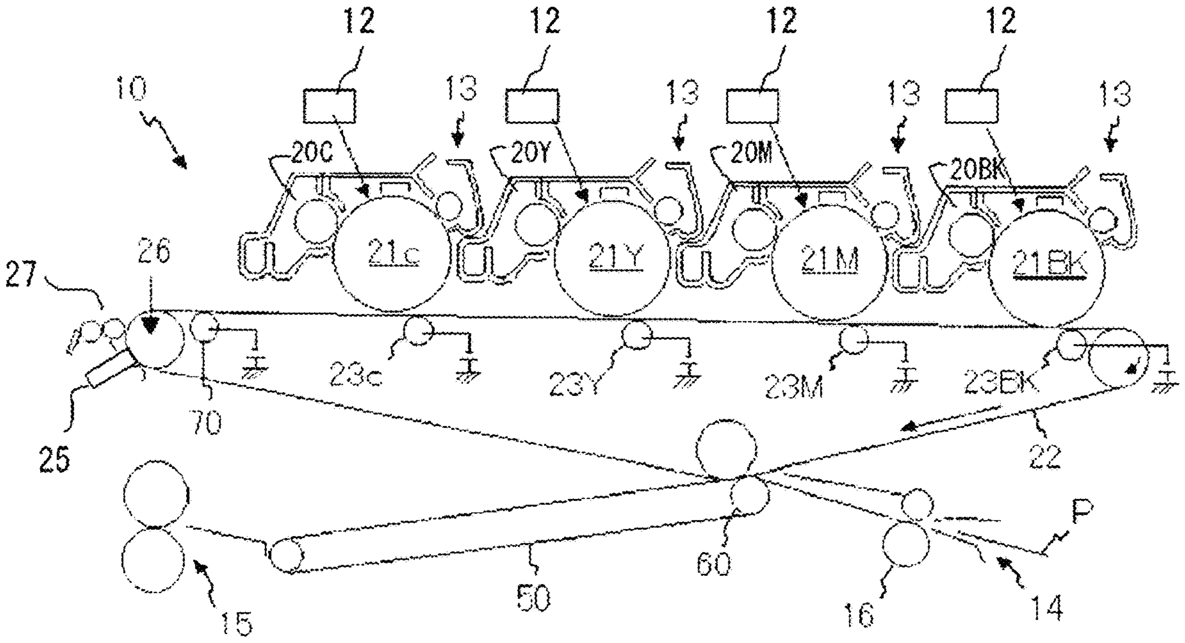
FIG. 4 is a schematic cross-sectional view illustrating an example of an image forming apparatus of the present disclosure.

FIG. 4 is a schematic view illustrating an example of the image forming apparatus of the present disclosure. An image forming apparatus 10 of FIG. 4 includes four image forming units for yellow, magenta, cyan, and black (hereinafter may be denoted as Y, M, C, and BK). These image forming units are configured the same, except that they use Y, M, C, and BK toners having mutually different colors as image forming substances for forming images.

Each image forming unit includes a photoconductor drum 21 (photoconductor drum 21C for cyan, photoconductor drum 21Y for yellow, photoconductor drum 21M for magenta, and photoconductor drum 21BK for black), a charging unit configured to charge the photoconductor drum 21 uniformly, a light exposing device 12 configured to expose the photoconductor drum 21 to light based on image information for each color and form a latent image for each color on the photoconductor drum 21, a developing device 20 (developing device 20C for cyan, developing device 20Y for yellow, developing device 20M for magenta, and developing device 20BK for black), which is a developing unit configured to develop the latent image with a developer of each color and form a toner image of each color, a transfer charger configured to transfer the toner image onto an intermediate transfer belt 22, a cleaning device 13, and a charge eliminating lamp.

The charging unit is a charging member belonging to a charging device serving as a means of charging. The developing device 20 is a developing unit configured to change the latent image formed on the surface of the photoconductor drum 21 to a toner image. The cleaning device 13 is a cleaning unit configured to clean a toner remaining on the photoconductor drum 21 from which the toner image has been transferred onto the intermediate transfer belt 22. The charge eliminating lamp that is unillustrated is a charge eliminating unit configured to eliminate the surface potential on the photoconductor drum 21 after being cleaned.

The photoconductor drum 21 has a drum shape. However, a sheet-type photoconductor or an endless belt-type photoconductor may also be used.

A transfer unit including the intermediate transfer belt 22 serving as the intermediate transfer medium is disposed below each image forming unit. The intermediate transfer belt 22 is an endless belt tensely spanned over three rollers 26, and can move in the direction indicated by the arrow in FIG. 4. A transfer roller 23 (transfer roller 23C for cyan, transfer roller 23Y for yellow, transfer roller 23M for magenta, and transfer roller 23BK for black) is disposed near the intermediate transfer belt 22 counter to the intermediate transfer belt 22. A transfer bias (secondary transfer bias) for transferring (secondarily transferring) a developed image (toner image) onto a sheet of transfer paper P serving as a recording medium can be applied to the transfer roller 23.

A cleaning blade 25 for an intermediate transfer medium configured to remove a residual toner on the intermediate transfer belt 22 from which a toner image has been transferred onto the recording paper P, and a lubricant applying unit 27 serving as a mechanism configured to apply a lubricant (e.g., zinc stearate) to the intermediate transfer medium are disposed near the roller 26. The cleaning blade 25 for an intermediate transfer medium is in contact with the intermediate transfer belt 22 in a direction counter to the direction of surface movement of the intermediate transfer belt 22. The particulars of the cleaning blade 25 for an intermediate transfer medium are as described above.

A secondary transfer device is disposed at a side of the intermediate transfer belt 22 opposite to the side at which the image forming units are disposed. The secondary transfer device includes a secondary transfer belt 50. The secondary transfer belt 50 is an endless belt tensely spanned over a pair of rollers 60. A recording paper P that is conveyed onto the secondary transfer belt 50 by a paper feeding unit 14 and registration rollers 16, and the intermediate transfer belt 22 can contact each other between the roller 26 and the rollers 60. A fixing device 15 is disposed near the secondary transfer belt 50.

EXAMPLES

The present disclosure will be described below by way of Examples and Comparative Examples. The present disclosure should not be construed as being limited to these Examples and Comparative Examples. “Part” represents “part by mass” unless otherwise particularly specified.

Example 1

<Production of Blade Base>

Polyurethane elastomer sheets obtained by centrifugal casting, curing, and post-crosslinking were used as an edge layer and a base layer. The average thickness and the Martens hardness (HM) of the edge layer and the base layer are as specified below.

Average thickness: 2.0 mm

Martens hardness (HM) of edge layer: 1.0 N/mm$^2$

Martens hardness (HM) of base layer: 1.1 N/mm$^2$

A blade base was produced by bonding the edge layer and the base layer. Then, the blade base was bonded to a metal plate.

<Production of Coating Layer>

—Preparation of Particle Dispersion A—

A polytetrafluoroethylene (PTFE) micropowder (TF9201Z, obtained from 3M Limited, having a volume average particle diameter of 200 nm) (5 parts) serving as a first fluorine-based resin, a VdF-HFP-TFE terpolymer formed of vinylidene fluoride (VdF), hexafluoropropylene (HFP), and tetrafluoroethylene (TFE) (2 parts) serving as a second fluorine-based resin, and 1,1,2,2-tetrafluoroethyl 2,2,2-trifluoroethyl ether (HFE-347, obtained from Tokyo Chemical Industry Co., Ltd.) (93 parts) serving as a fluorine-based dispersion solvent were added into a screw tube and stirred using, for example, a stirrer, to prepare a particle dispersion A.

—Preparation of Particle Dispersion B—

A polymethyl methacrylic acid (PMMA) water dispersion (MX100 W, obtained from Nippon Shokubai Co., Ltd., having a volume average particle diameter of 150 nm) (95 parts), and a polyvinyl butyral (PVB) resin (ESLEC KW-M, obtained from Sekisui Chemical Co., Ltd., having an acetalization degree of 24±3 mol %) (5 parts) serving as a second fluorine-based resin were added into a screw tube and stirred using, for example, a stirrer, to prepare a particle dispersion B.

—Dipping—

Figure 5:
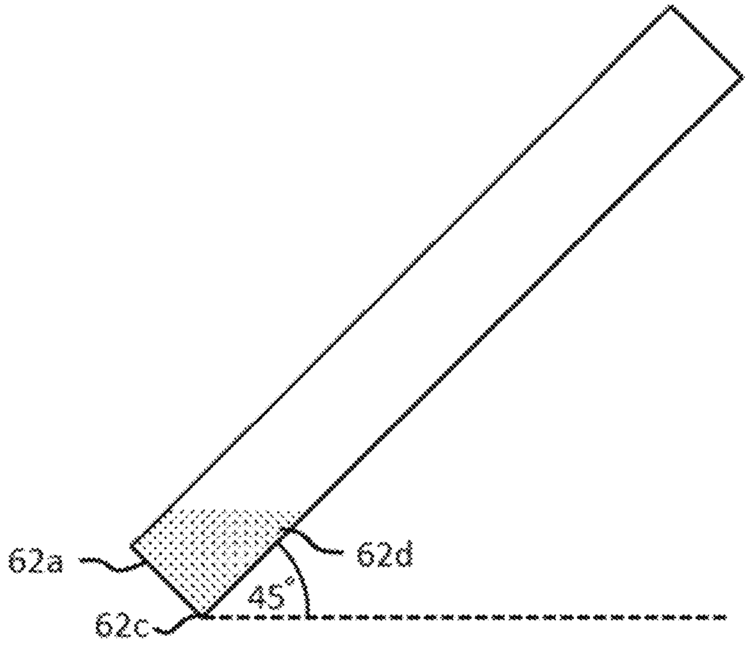
FIG. 5 is a schematic view illustrating an example of a method for forming a coating layer in Example of the present disclosure.

One end surface of the blade base in the peripheral side surfaces of the blade base, the one end surface being used as the forefront end of the cleaning blade (hereinafter, the one end surface may be referred to as a cleaning blade forefront-end surface) was dipped into the particle dispersion A to a depth of 2 mm from the cleaning blade forefront-end surface at a right angle with respect to the horizontal plane, and raised at a raising speed of 1 mm/s. In order to make the PTFE particles necessary for the cleaning function gather to a portion of the cleaning blade forefront-end surface, the portion including the contacting side, the blade base was inclined by approximately 45° as illustrated in FIG. 5. Then, the blade base was dried at normal temperature (25° C.) for 30 minutes, to produce a cleaning blade of Example 1.

Examples 2 to 8 and Comparative Examples 1 to 7

Cleaning blades of Examples 2 to 8 and Comparative Examples 1 to 7 were produced in the same manner as in Example 1, except that the content of the first fluorine-based resin in the cleaning blade, the content of the second fluorine-based resin in the cleaning blade, the content of the dispersion solvent, the Martens hardness of the edge layer, the Martens hardness of the base layer, and the average thickness of the coating layer were changed as presented in Tables 1 to 4.

In Comparative Example 3, the blade base of the cleaning blade was not provided with a coating layer. In Comparative Example 4, the particle dispersion B was used.

<Assembly of Image Forming Apparatus>

Each of the cleaning blades obtained in Examples 1 to 8 and Comparative Examples 1 to 7 was attached on a process cartridge of a color multifunction peripheral (IMAGIO MP C4500, obtained from Ricoh Company, Ltd., the configuration of its printer unit being similar to the image forming apparatus 10 illustrated in FIG. 4), to assemble an image forming apparatus.

The cleaning blade was attached on the image forming apparatus in a manner that the linear load would be 20 g/cm and the cleaning angle would be 79°.

<Measurement of Martens Hardness>

The Martens hardness of the edge layer and the Martens hardness of the base layer of the cleaning blades obtained in Examples 1 to 8 and Comparative Examples 1 to 7 were measured.

The Martens hardness (HM) was measured by indenting a Berkowitz indenter into the location of measurement for 10 seconds under a load of 1,000 ρN, holding the Berkowitz indenter there for 5 seconds, and withdrawing the Berkowitz indenter in 10 seconds at the same loading rate, using a nano indenter (ENT-3100, obtained from Elionix Inc.) according to ISO14577. The results are presented in Tables 1 to 4.

The location of the edge layer at which the Martens hardness was measured was a location having a distance of 20 μm from the ridgeline of the forefront end of the edge layer. The location of the base layer at which the Martens hardness was measured was a location having a distance of 20 μm from an end of the base layer.

The Martens hardness was the average of measurements obtained at from 4 through 6 points included in each location of measurement.

<Measurement of Average Thickness of Coating Layer>

The average thickness of the coating layer of the cleaning blades obtained in Examples 1 to 8 and Comparative Examples 1 to 7 was measured. The results are presented in Tables 1 to 4.

The average thickness was measured by scraping a part of the coating layer with, for example, a spatula or a cotton swab, and subjecting the scraped part to profilometry using a contact-type surface roughness tester (SURFTEST SJ-500: obtained from Mitutoyo Corporation).

<Evaluation of Torque Increase Rate>

Using the image forming apparatus described above, outputs were obtained under the conditions specified below, and a torque change rate indicating increase in the driving torque for the intermediate transfer medium was measured. After the outputting, the forefront end of the cleaning blade was observed with a laser microscope (LEXT OLS4500, obtained from Olympus Corporation), to evaluate the torque increase rate according to the evaluation criteria described below. The evaluation results are presented in Tables 1 to 4. In the evaluation criteria, "the initial period" represents a period of time in which the first to five hundredth sheets were output.

Environment: 23° C./45% RH

Paper passing condition: a blank chart

Number of sheets output: 5,000 sheets (A4 size, horizontally long)

—Evaluation Criteria—

A: The torque change rate indicating torque increase was lower than or equal to 50% of the torque in the initial period, and the intermediate transfer medium was not stopped by the driving torque increase. Moreover, when the forefront end of the cleaning blade was observed after the outputting, there was not even a hint of a trace indicating that the forefront end had rolled up.

B: The torque change rate indicating torque increase was lower than or equal to 50% of the torque in the initial period, and the intermediate transfer medium was not stopped by the driving torque increase. However, when the forefront end of the cleaning blade was observed after the outputting, there was a trace of roll-up, which nevertheless was not of a level at which a toner would slip through, and was not a problem against actual use.

C: The intermediate transfer medium was stopped by torque increase. Moreover, when the forefront end of the cleaning blade was observed after the outputting, there was a trace of roll-up, which was of a level at which a toner would slip though, and was a problem against actual use.

<Image Quality Evaluation (Cleaning Performance)>

Using the image forming apparatus described above, outputs were obtained under the conditions specified below. Subsequently, the forefront end of the cleaning blade and the surface of the intermediate transfer medium were observed with a laser microscope (LEXT OL54500, obtained from Olympus Corporation), to evaluate image quality according to the evaluation criteria described below. The evaluation results are presented in Tables 1 to 4.

Environment: 27° C./80% RH

Paper passing condition: a chart having an image area percentage of 5% was printed three times per job.

Number of sheets output: 50,000 sheets (A4 size, horizontally long)

—Evaluation Criteria—

A: No toner that had slipped through due to a poor cleaning performance was visually observed from either of the printed sheets and the intermediate transfer medium. Moreover, when the photoconductor was observed with a microscope in the longer direction, no streaky trace of toner slip-through was observed.

B: No toner that had slipped through due to a poor cleaning performance was visually observed from either of the printed sheets and the intermediate transfer medium. However, when the photoconductor was observed with a microscope in the longer direction, a streaky trace of toner slip-through was observed.

C: A toner that had slipped through due to a poor cleaning performance was visually observed from both of the printed sheets and the intermediate transfer medium.

TABLE 1

| | | | Ex. | | | |
|---|---|---|---|---|---|---|
| | | | 1 | 2 | 3 | 4 |
| Coating layer | First fluorine-based resin | PTFE (particle diameter: 0.230 μm) | 5.0 | 4.5 | 5.5 | 5.0 |
| | | PMMA (particle diameter: 0.150 μm) | — | — | — | — |
| | Second fluorine-based resin | Vdf/HFP/TFE | 2.0 | 2.0 | 2.0 | 2.0 |
| | Dispersion solvent | 1,1,2,2-Tetrafluoroethyl 2,2,2-trifluoroethyl ether | 93.0 | 93.5 | 92.5 | 93.0 |
| | | PVB | — | — | — | — |
| Average thickness [μm] at location of 20 μm from edge | | | 5.0 | 2.0 | 3.0 | 5.0 |
| Martens hardness [$N/mm^2$] of edge layer | | | 1.00 | 2.20 | 2.30 | 2.60 |
| Martens hardness [$N/mm^2$] of base layer | | | 1.10 | 1.40 | 1.40 | 1.40 |
| Evaluation | | Torque increase rate | A | A | A | A |
| | | Cleaning performance | A | A | A | A |

TABLE 2

| | | | Ex. | | | |
|---|---|---|---|---|---|---|
| | | | 5 | 6 | 7 | 8 |
| Coating layer | First fluorine-based resin | PTFE (particle diameter: 0.230 μm) | 6.0 | 5.5 | 6.0 | 8.0 |
| | | PMMA (particle diameter: 0.150 μm) | — | — | — | — |
| | Second fluorine-based resin | Vdf/HFP/TFE | 2.0 | 2.0 | 2.0 | 2.0 |
| | Dispersion solvent | 1,1,2,2-Tetrafluoroethyl 2,2,2-trifluoroethyl ether | 92.0 | 92.5 | 92.0 | 90.0 |
| | | PVB | — | — | — | — |
| Average thickness [μm] at location of 20 μm from edge | | | 10.0 | 2.0 | 3.0 | 7.0 |
| Martens hardness [$N/mm^2$] of edge layer | | | 3.00 | 0.50 | 0.70 | 3.00 |
| Martens hardness [$N/mm^2$] of base layer | | | 1.50 | 1.10 | 1.10 | 1.40 |
| Evaluation | | Torque increase rate | A | B | B | B |
| | | Cleaning performance | B | A | A | B |

TABLE 3

| | | | Comp. Ex. | | | |
|---|---|---|---|---|---|---|
| | | | 1 | 2 | 3 | 4 |
| Coating layer | First fluorine-based resin | PTFE (particle diameter: 0.230 μm) | — | 6.0 | — | — |
| | | PMMA (particle diameter: 0.150 μm) | — | — | — | 95.0 |
| | Second fluorine-based resin | Vdf/HFP/TFE | 2.0 | — | — | — |
| | Dispersion solvent | 1,1,2,2-Tetrafluoroethyl 2,2,2-trifluoroethyl ether | 98.0 | 94.0 | — | — |
| | | PVB | — | — | — | 5.0 |
| Average thickness [μm] at location of 20 μm from edge | | | 15.0 | 1.5 | — | 2.0 |
| Martens hardness [$N/mm^2$] of edge layer | | | 3.5 | 0.7 | 1.0 | 0.8 |
| Martens hardness [$N/mm^2$] of base layer | | | 1.2 | 1.2 | 1.4 | 1.2 |
| Evaluation | | Torque increase rate | B | C | C | C |
| | | Cleaning performance | C | B | B | B |

TABLE 4

| | | | Comp. Ex. | | |
|---|---|---|---|---|---|
| | | | 5 | 6 | 7 |
| Coating layer | First fluorine-based resin | PTFE (particle diameter: 0.230 μm) | — | 6.0 | 6.0 |
| | | PMMA (particle diameter: 0.150 μm) | — | — | — |
| | Second fluorine-based resin | Vdf/HFP/TFE | 2.0 | 2.0 | 2.0 |
| | Dispersion solvent | 1,1,2,2-Tetrafluoroethyl 2,2,2-trifluoroethyl ether | 98.0 | 92.0 | 92.0 |
| | | PVB | — | — | — |
| Average thickness [μm] at location of 20 μm from edge | | | 10.0 | 15.0 | 2.0 |
| Martens hardness [$N/mm^2$] of edge layer | | | 1.0 | 3.2 | 0.4 |
| Martens hardness [$N/mm^2$] of base layer | | | 1.2 | 1.2 | 1.2 |
| Evaluation | | Torque increase rate | C | B | C |
| | | Cleaning performance | B | C | C |

Aspects of the present disclosure are, for example, as follows.

<1> A cleaning blade for an intermediate transfer medium, a cleaning target of the cleaning blade being an intermediate transfer medium, the cleaning blade including:

an edge layer; and a coating layer, wherein the coating layer provided on a forefront end of the edge layer at which the edge layer contacts the intermediate transfer medium contains a first fluorine-based resin and a second fluorine-based resin incompatible with the first fluorine-based resin, and the cleaning blade for an intermediate transfer medium has a Martens hardness of 0.5 $N/mm^2$ or greater and 3 $N/mm^2$ or less at a location having a distance of 20 μm from a ridgeline of the forefront end of the edge layer.

<2> The cleaning blade for an intermediate transfer medium according to <1>, wherein an average thickness of the coating layer at a location having a distance of 20 μm from the ridgeline of the forefront end of the edge layer is 2.0 μm or greater and 10.0 μm or less.

<3> The cleaning blade for an intermediate transfer medium according to <1> or <2>, wherein the first fluorine-based resin contains polytetrafluoroethylene (PTFE), and the first fluorine-based resin is spherical particles having a volume average particle diameter of 1 μm or less.

<4> The cleaning blade for an intermediate transfer medium according to any one of <1> to <3>, wherein the second fluorine-based resin is a polymer of any monomer selected from the group consisting of vinylidene fluoride (VdF), hexafluoropropylene (HFP), and tetrafluoroethylene (TFE), a bipolymer of any two monomers selected from the group consisting of vinylidene fluoride (VdF), hexafluoropropylene (HFP), and tetrafluoroethylene (TFE), or a terpolymer of three monomers selected from the group consisting of vinylidene fluoride (VdF), hexafluoropropylene (HFP), and tetrafluoroethylene (TFE).

<5> The cleaning blade for an intermediate transfer medium according to <4>, wherein the second fluorine-based resin further includes a fluorine-based oil.

<6> The cleaning blade for an intermediate transfer medium according to <5>, wherein an average molecular weight of the fluorine-based oil is from 2,000 through 3,500.

<7> The cleaning blade for an intermediate transfer medium according to any one of <1> to <6>, wherein a base of the cleaning blade for an intermediate transfer medium has a single layer structure formed of a polyurethane rubber, or a laminate structure in which a plurality of polyurethane rubbers varying in Martens hardness are laminated.

<8> The cleaning blade for an intermediate transfer medium according to <7>, wherein the Martens hardness of the polyurethane rubbers is 0.5 $N/mm^2$ or greater and 2 $N/mm^2$ or less.

<9> An image forming apparatus, including:

a developing unit configured to develop a latent image formed on an image bearer capable of bearing a toner image, with a toner;

a primary transfer unit configured to primarily transfer the toner image obtained through developing by the developing unit onto an intermediate transfer medium; and a cleaning unit configured to remove the toner remaining on a surface of the intermediate transfer medium, wherein the cleaning unit is the cleaning blade for an intermediate transfer medium according to any one of <1> to <8>.

The cleaning blade according to any one of <1> to <8> and the image forming apparatus according to <9> can solve the various problems in the related art and achieve the object of the present disclosure.

Further, the present invention is not limited to these embodiments, but various variations and modifications may be made without departing from the scope of the present invention.

What is claimed is:

1. A cleaning blade, a cleaning target of the cleaning blade being an intermediate transfer medium, the cleaning blade comprising:

an edge layer; and a coating layer, wherein the coating layer on a forefront end of the edge layer, at which the edge layer is to contact the intermediate transfer medium, includes a first fluorine-based resin and a second fluorine-based resin incompatible with the first fluorine-based resin, and the cleaning blade has a Martens hardness of 0.5 N/mm2 or greater and 3 N/mm2 or less at a location having a distance of 20 μm from a ridgeline of the forefront end of the edge layer, wherein a base of the cleaning blade includes a single layer structure including a polyurethane rubber, or a laminate structure in which a plurality of polyurethane rubbers varying in Martens hardness are laminated.

2. The cleaning blade according to claim 1, wherein an average thickness of the coating layer at the location having the distance of 20 μm from the ridgeline of the forefront end of the edge layer is 2.0 μm or greater and 10.0 μm or less.

3. The cleaning blade according to claim 1, wherein:

the first fluorine-based resin includes polytetrafluoroethylene (PTFE), and the first fluorine-based resin includes spherical particles having a volume average particle diameter of 1 μm or less.

4. The cleaning blade according to claim 1, wherein the second fluorine-based resin is a polymer of any monomer selected from the group consisting of vinylidene fluoride (VdF), hexafluoropropylene (HFP), and tetrafluoroethylene (TFE), a bipolymer of any two monomers selected from the group consisting of vinylidene fluoride (VdF), hexafluoropropylene (HFP), and tetrafluoroethylene (TFE), or a terpolymer of three monomers selected from the group consisting of vinylidene fluoride (VdF), hexafluoropropylene (HFP), and tetrafluoroethylene (TFE).

5. The cleaning blade according to claim 4, wherein the second fluorine-based resin further includes a fluorine-based oil.

6. The cleaning blade according to claim 5, wherein an average molecular weight of the fluorine-based oil is from 2,000 through 3,500.

7. The cleaning blade according to claim 1, wherein the Martens hardness of the polyurethane rubbers is 0.5 N/mm2 or greater and 2 N/mm2 or less.

8. An image forming apparatus, comprising:

a developer to develop a latent image formed on an image bearer capable of bearing a toner image, with a toner;

a primary transferer to primarily transfer the toner image obtained through developing by the developing unit onto an intermediate transfer medium; and a cleaner to remove the toner remaining on a surface of the intermediate transfer medium, wherein the cleaner includes the cleaning blade according to claim 1.

9. A system, comprising:

the cleaning blade according to claim 1; and the intermediate transfer medium.

10. A cleaning blade, a cleaning target of the cleaning blade being an intermediate transfer medium, the cleaning blade comprising:

an edge layer; and a coating layer, wherein the coating layer on a forefront end of the edge layer, at which the edge layer is to contact the intermediate transfer medium, includes a first fluorine-based resin and a second fluorine-based resin incompatible with the first fluorine-based resin, and the cleaning blade has a Martens hardness of 0.5 N/mm2 or greater and 3 N/mm2 or less at a location having a distance of 20 μm from a ridgeline of the forefront end of the edge layer, wherein the second fluorine-based resin is a polymer of any monomer selected from the group consisting of vinylidene fluoride (VdF), hexafluoropropylene (HFP), and tetrafluoroethylene (TFE), a bipolymer of any two monomers selected from the group consisting of vinylidene fluoride (VdF), hexafluoropropylene (HFP), and tetrafluoroethylene (TFE), or a terpolymer of three monomers selected from the group consisting of vinylidene fluoride (VdF), hexafluoropropylene (HFP), and tetrafluoroethylene (TFE), wherein the second fluorine-based resin further includes a fluorine-based oil, and wherein an average molecular weight of the fluorine-based oil is from 2,000 through 3,500.

11. The cleaning blade according to claim 10, wherein an average thickness of the coating layer at the location having the distance of 20 μm from the ridgeline of the forefront end of the edge layer is 2.0 μm or greater and 10.0 μm or less.

12. The cleaning blade according to claim 10, wherein:

the first fluorine-based resin includes polytetrafluoroethylene (PTFE), and the first fluorine-based resin includes spherical particles having a volume average particle diameter of 1 μm or less.

13. The cleaning blade according to claim 10, wherein a base of the cleaning blade has a single layer structure formed of a polyurethane rubber, or a laminate structure in which a plurality of polyurethane rubbers varying in Martens hardness are laminated.

14. The cleaning blade according to claim 13, wherein the Martens hardness of the polyurethane rubbers is 0.5 N/mm2 or greater and 2 N/mm2 or less.

15. An image forming apparatus, comprising:

a developer to develop a latent image formed on an image bearer capable of bearing a toner image, with a toner;

a primary transferer to primarily transfer the toner image obtained through developing y the developing unit onto an intermediate transfer medium; and a cleaner to remove the toner remaining on a surface of the intermediate transfer medium, wherein the cleaner includes the cleaning blade according to claim 10.

16. A system, comprising:

the cleaning blade according to claim 10; and the intermediate transfer medium.

* * * * *